(12) United States Patent
Muraoka et al.

(10) Patent No.: US 7,306,292 B2
(45) Date of Patent: Dec. 11, 2007

(54) BICYCLE HUB

(75) Inventors: Tsutomu Muraoka, Osaka (JP); Kazuki Koshiyama, Osaka (JP)

(73) Assignee: Shimano Inc., Osaka (JP)

( * ) Notice: Subject to any disclaimer, the term of this patent is extended or adjusted under 35 U.S.C. 154(b) by 165 days.

(21) Appl. No.: 11/138,646

(22) Filed: May 27, 2005

(65) Prior Publication Data
US 2006/0267398 A1 Nov. 30, 2006

(51) Int. Cl.
*B60B 1/04* (2006.01)
*B60B 27/00* (2006.01)
(52) U.S. Cl. .................. 301/61; 301/59; 301/110.5
(58) Field of Classification Search ............ 301/57, 301/59, 61, 110.5, 55, 56, 104; 411/104
See application file for complete search history.

(56) References Cited

U.S. PATENT DOCUMENTS

| | | | | | |
|---|---|---|---|---|---|
| 280,633 | A | * | 7/1883 | Latta | .......... 280/259 |
| 312,277 | A | * | 2/1885 | Latta | .......... 301/2.5 |
| 382,885 | A | * | 5/1888 | Latta | .......... 301/56 |
| 1,515,940 | A | * | 11/1924 | Edwards | .......... 152/414 |
| 4,861,207 | A | * | 8/1989 | Do | .......... 411/104 |
| 4,948,313 | A | * | 8/1990 | Zankovich | .......... 411/85 |
| 4,998,701 | A | * | 3/1991 | Rawald | .......... 248/224.7 |
| 6,409,278 | B1 | * | 6/2002 | Nakajima | .......... 301/59 |
| 6,457,923 | B1 | * | 10/2002 | Grossman | .......... 411/104 |
| 6,485,108 | B1 | | 11/2002 | Tabe | |
| 6,520,595 | B1 | | 2/2003 | Schlanger | |
| 6,899,401 | B2 | * | 5/2005 | Schlanger | .......... 301/59 |
| 7,070,245 | B2 | * | 7/2006 | Tanaka | .......... 301/59 |
| 2001/0054840 | A1 | * | 12/2001 | Schlanger | .......... 301/59 |
| 2003/0173821 | A1 | * | 9/2003 | Chen | .......... 301/59 |
| 2004/0130204 | A1 | * | 7/2004 | Schlanger | .......... 301/59 |
| 2004/0262983 | A1 | | 12/2004 | Tanaka | |
| 2005/0067881 | A1 | | 3/2005 | Schlanger | |
| 2006/0197370 | A1 | * | 9/2006 | Mercat et al. | .......... 301/59 |

FOREIGN PATENT DOCUMENTS

| | | |
|---|---|---|
| JP | 08-108701 A | 4/1996 |
| JP | 08108701 A * | 4/1996 |

\* cited by examiner

*Primary Examiner*—Russell D. Stormer
*Assistant Examiner*—Kip Kotter
(74) *Attorney, Agent, or Firm*—Global IP Counselors, LLP

(57) ABSTRACT

A bicycle hub has an axle and a hub shell rotatably disposed about the axle with a plurality of fixing portions disposed at opposite ends of the hub shell. Each of the fixing elements has a pair of spoke attachment structures to attach a pair of inner ends of a pair of spokes to the hub shell. The fixing elements are removably coupled to the fixing portions of the hub shell.

23 Claims, 13 Drawing Sheets

BICYCLE HUB

BACKGROUND OF THE INVENTION

1. Field of the Invention

This invention generally relates to a bicycle hub for a bicycle wheel. More specifically, the present invention relates to a bicycle hub for a bicycle wheel that has fixing elements with a pair of spoke attachment structures to attach a pair of inner ends of a pair of spokes to the hub.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle wheel. Bicycle wheels are constantly being redesigned to be strong, lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to holes in the rim.

The above types of wheels have been designed for use with tube tires or tubeless tires. Typically, tubeless tire wheels have an annular seal arranged to seal the spoke attachment openings of the rim. Rims designed for tube tires also often have an annular member covering the spoke attachments. In any case, these typical types of wheels can be expensive and complicated to manufacture and assemble. Moreover, these typical wheels are not always as strong and lightweight, as desired. Furthermore, with these typical wheels it can be difficult, complicated and/or expensive to replace a spoke or spokes.

In view of the above, it will be apparent to those skilled in the art from this disclosure that there exists a need for an improved bicycle hub for a bicycle wheel. This invention addresses this need in the art as well as other needs, which will become apparent to those skilled in the art from this disclosure.

SUMMARY OF THE INVENTION

One object of the present invention is to provide a bicycle wheel with a bicycle hub that is relatively strong yet relatively lightweight.

Another object of the present invention is to provide a bicycle hub that is relatively simple and inexpensive to manufacture and assemble.

The foregoing objects can basically be attained by providing a bicycle hub comprising an axle, a hub shell and a plurality of fixing elements. The hub shell is rotatably disposed about the axle with a plurality of fixing portions disposed at opposite ends of the hub shell. The fixing elements are removably coupled to the fixing portions of the hub shell with each of the fixing elements having a pair of spoke attachment structures to attach a pair of inner ends of a pair of spokes to the hub shell.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
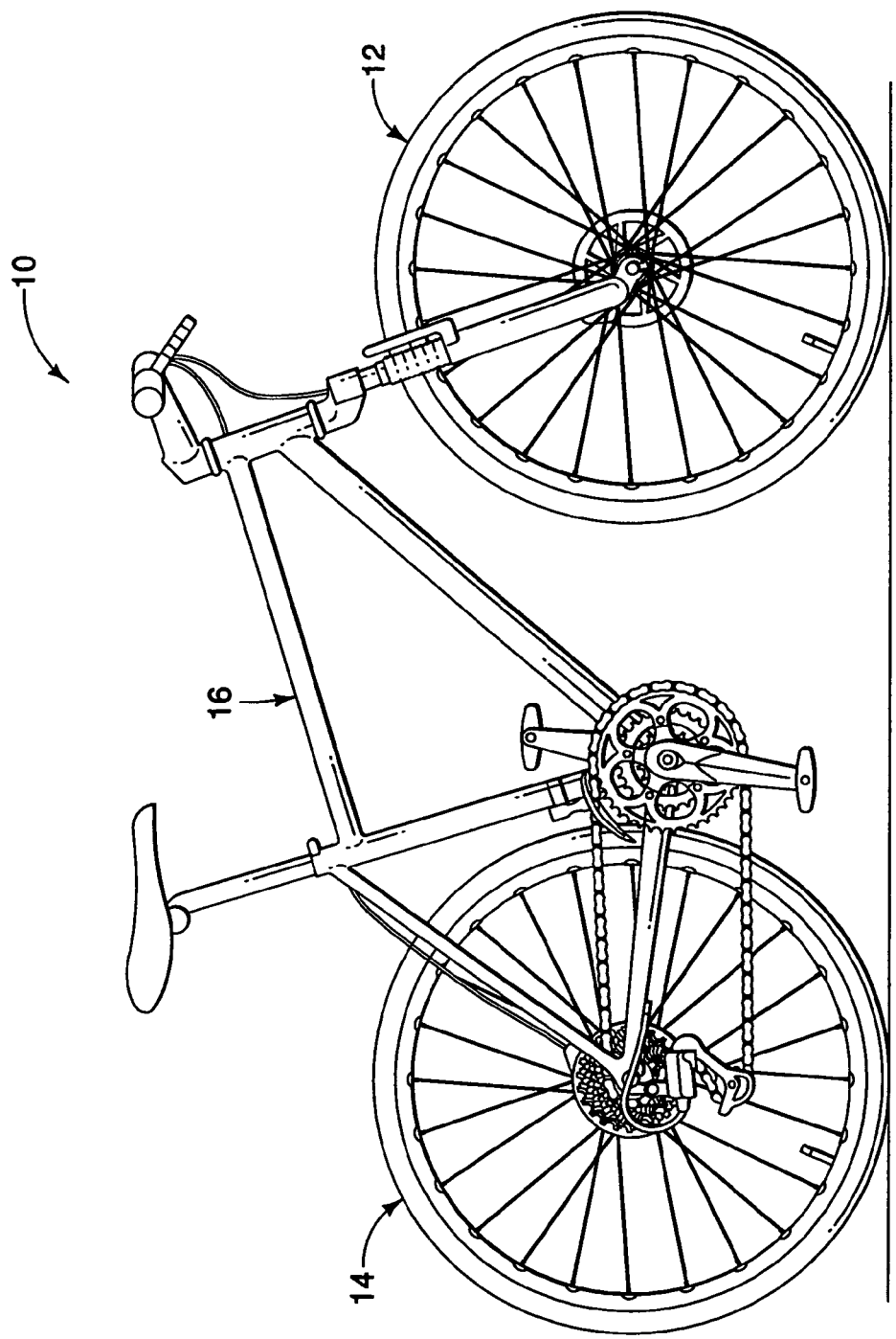
FIG. 1 is a side elevational view of a front bicycle wheel with a bicycle hub in accordance with a first preferred embodiment of the present invention.

Referring initially to FIG. 1, a bicycle 10 is illustrated with a front bicycle wheel 12 and a rear bicycle wheel 14 in accordance with a first embodiment of the present invention. The bicycle wheels 12 and 14 are attached to a bicycle frame 16 in a conventional manner. Since the parts of the bicycle 10 are well known in the art, the parts of the bicycle 10 will not be discussed or illustrated in detail herein, except for the parts that relate to the present invention. In other words, only the parts related to the bicycle wheels 12 and 14 will be discussed and illustrated in detail herein. Moreover, various conventional bicycle parts such as brakes, additional sprockets, derailleurs, etc., which may or may not be illustrated herein, can be used in conjunction with the present invention.

Generally, the present invention is applied in the same manner to both of the bicycle wheels 12 and 14. The only significant difference between the front bicycle wheel 12 and the rear bicycle wheel 14 is that the rear bicycle wheel 14 has a hub with a freewheel to support a plurality of sprockets and rim dished to the opposite side from the front bicycle wheel 12. Thus, only the front bicycle wheel 12 will be discussed and illustrated in detail herein.

Figure 2:
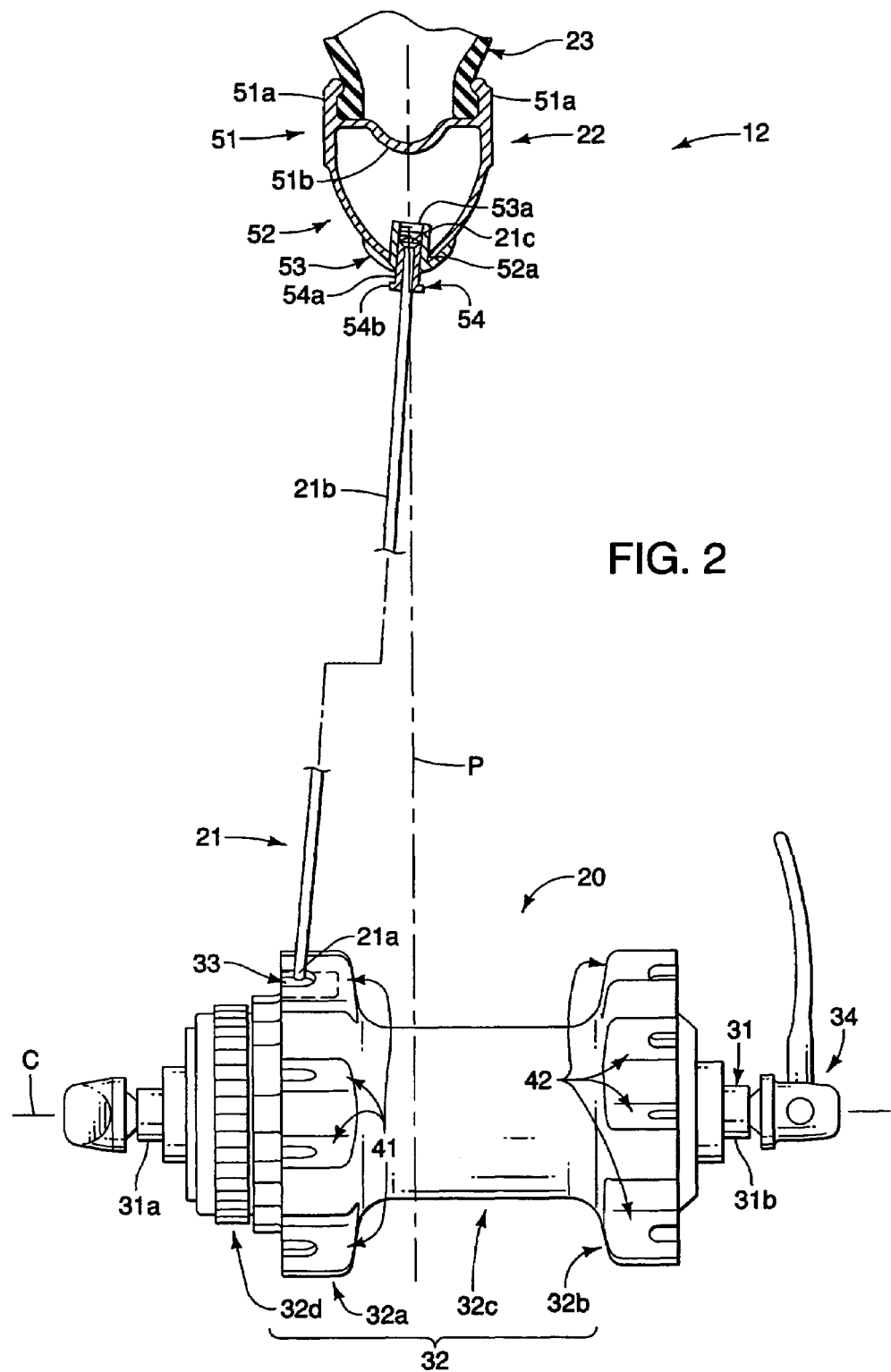
FIG. 2 is a partial rear side view of the front wheel illustrated in FIG. 1 with the bicycle hub shown in elevation and the rim shown in cross section.
Figure 3:
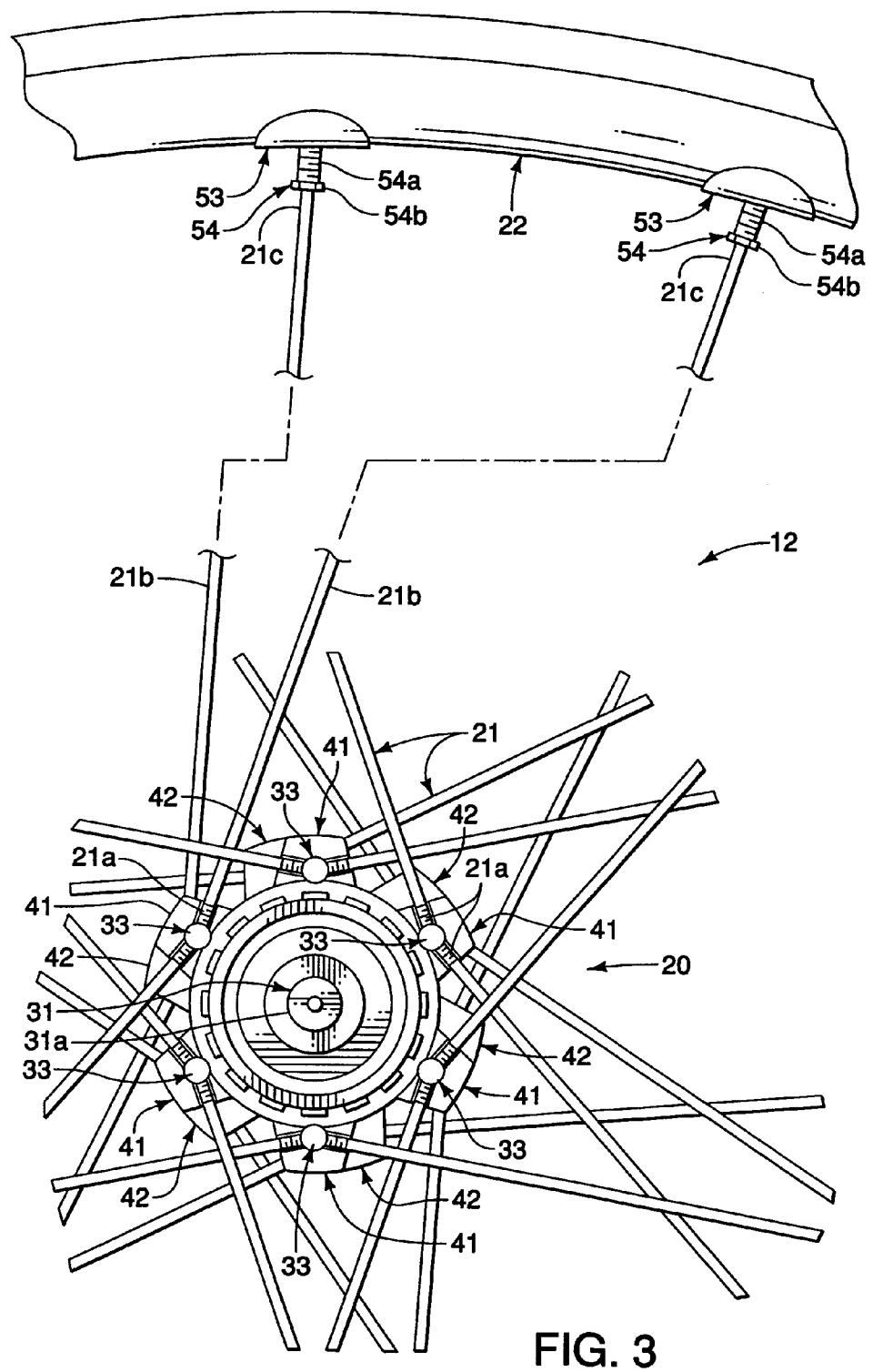
FIG. 3 is a partial side elevational view of the front wheel illustrated in FIGS. 1 and 2.
Figure 4:
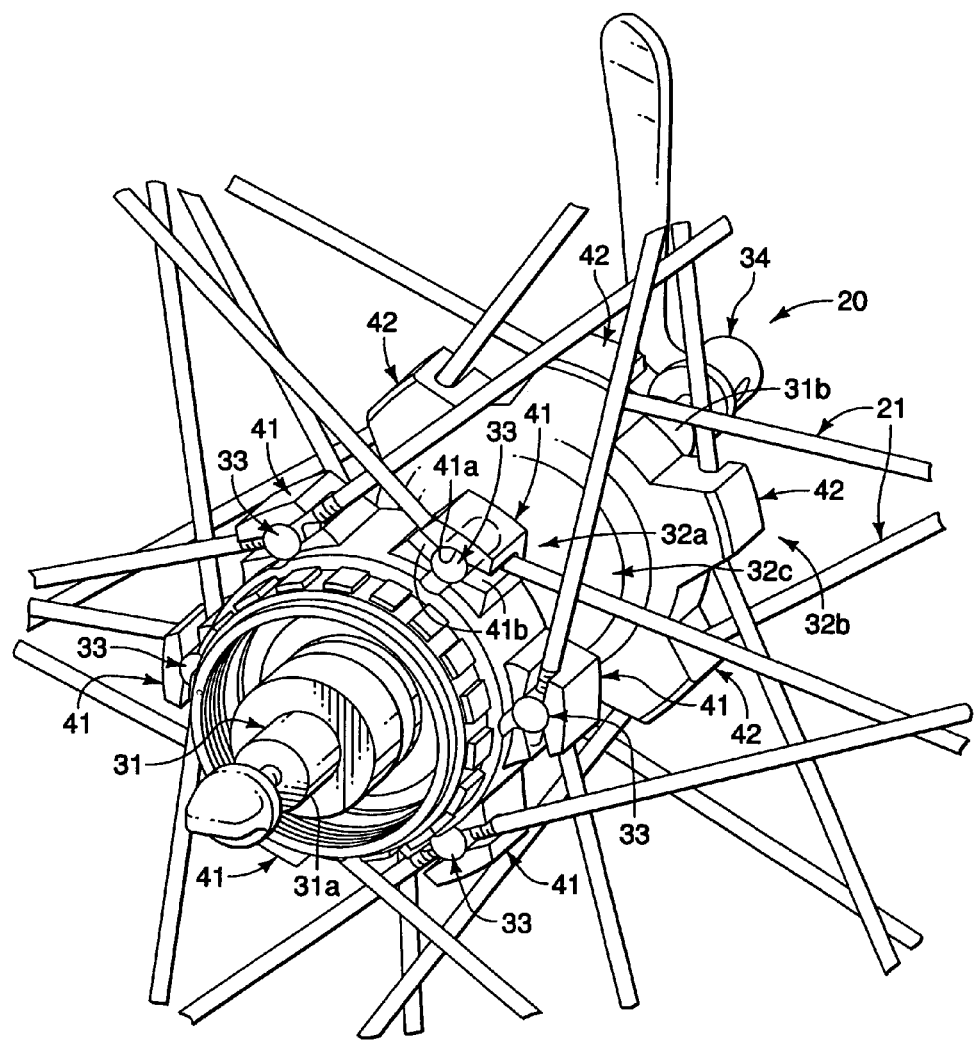
FIG. 4 is an enlarged partial perspective view of the bicycle hub and spokes of the front wheel illustrated in FIGS. 1-3.

Referring now to FIGS. 2 and 3, the bicycle wheel 12 basically includes a center hub 20, a plurality of spokes 21, and an annular rim 22 with a pneumatic tire 23. The spokes 21 are tension spokes that interconnect the hub 20 and the rim 22 together as explained below. The tire 23 can include a tire and tube type, or can be a tubeless tire type, as needed and/or desired.

In the illustrated embodiment, the bicycle wheel 12 includes twenty-four of the spokes 21 that extend generally tangentially from the hub 20 to the rim 22. Also, in the illustrated embodiment, the spokes 21 are coupled to the rim 22 at equally spaced circumferential locations as seen in FIG. 1. Of course, it will be apparent to those skilled in the art from this disclosure that bicycle wheel 12 could use a modified rim and/or hub in order to accommodate different spoking arrangements without departing from the scope of the present invention. Moreover, it will be apparent to those skilled in the art from this disclosure that the bicycle wheel 12 could use a modified rim and/or hub in order to accommodate fewer or more spokes 21 if needed and/or desired. In any case, the spokes 21 are preferably coupled to the annular rim 22 in circumferentially spaced arrangement.

Figure 5:
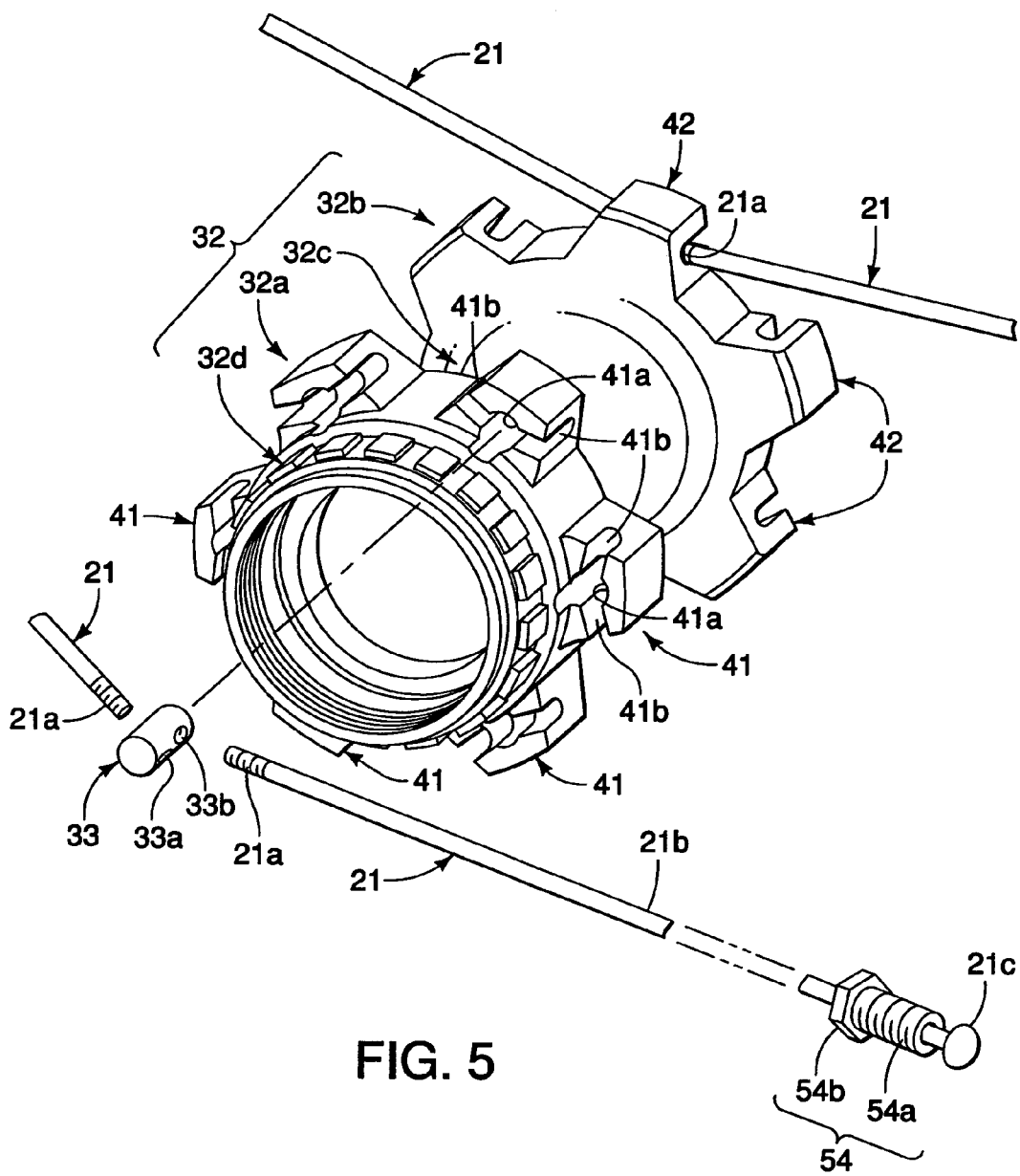
FIG. 5 is an exploded partial perspective view of the bicycle hub and some of the spokes of the front wheel illustrated in FIGS. 1-4.

Referring now to FIGS. 2 and 5, the spokes 21 will now be discussed in more detail. The spokes 21 are preferably straight spokes that are identical to each other. Each of the spokes 21 basically includes a threaded inner end portion 21a, a straight center or a middle portion 21b and an outer end or head portion 21c. The portions 21a, 21b and 21c of each of the spokes 21 are preferably integrally formed together as a one piece, unitary member. The threaded inner end portions 21a of the spokes 16 are coupled to the hub 20, while the outer end portions 21c of the spokes 21 are coupled to the rim 22, as explained below. The spokes 21 are preferably wire-type spokes that are relatively conventional. Thus, the spokes 21 will not be discussed and/or illustrated in detail herein, except as related to the hub 20 of the present invention.

Referring to FIGS. 2-5, the hub 20 will now be discussed in more detail. The hub 20 basically includes an axle 31 with a hub shell or body 32 disposed about the axle 31 in a rotatable manner by a pair of bearings in a conventional manner. The hub 20 further includes a plurality of spoke fixing elements 33 for securing the spokes The parts of the hub 20, other than the hub shell or body 32 and the spoke fixing elements 33, are relatively conventional. Thus, these parts of the hub 20 will not be discussed or illustrated in detail herein.

The axle 31 is a hard rigid member that has a pair of opposite free ends 31a and 31b extending outwardly from the hub shell 32. The free ends 31a and 31b of the axle 31 are fixedly coupled the frame 16 via a quick release device 34 in a conventional manner. The axle 31 has a center axis C that defines the center axis of the wheel 12.

The hub shell 32 is a hard rigid tubular member that is rotatably supported on the axle 31. The hub shell 32 includes a first spoke mounting portion 32a, a second spoke mounting portion 32b and a tubular center portion 32c disposed between the mounting portions 32a and 32b. Thus, the spoke mounting portions 32a and 32b are disposed at opposite ends of the hub shell 32. The spoke mounting portions 32a and 32b are configured and arranged to fixedly secure the spokes 21 thereto. The spoke mounting portions 32a and 32b are preferably mirror images of each other as shown, except that the spoke mounting portion 32a is circumferentially offset from the spoke mounting portion 32b, as explained below. Of course, the spoke mounting portions 32a and 32b do not need to be mirror images of each other if needed and/or desired.

Optionally, the hub shell 32 is also provided with a brake mounting portion 32d for attaching a disc brake rotor (not shown). The optional disc brake rotor (not shown) can be attached to the hub shell 32 by a retaining or locking ring that is threaded into on the end of the hub shell 32 such as disclosed in U.S. Pat. No. 6,371,252 to Kanehisa (Assigned to Shimano, Inc.).

The spoke mounting portion 32a includes a plurality (six) of individual spoke fixing portions or protrusions 41 that extend outwardly in a radial manner from one end of the hub shell 32. The spoke fixing protrusions 41 are equally spaced apart in a circumferential direction around the main body of the spoke mounting portion 32a. Each of the spoke fixing protrusions 41 is configured and arranged to fix a pair of the spokes 21 thereto using one of the spoke fixing elements 33. Each of the spoke fixing protrusions 41 is preferably identical as shown. Of course, the spoke fixing protrusions 41 do not need to be identical if needed and/or desired.

Likewise, the mounting portion 32b includes a plurality (six) of individual spoke fixing portions or protrusions 42 that extend outwardly in a radial manner from one end of the hub shell 32. The spoke fixing protrusions 42 are equally spaced apart in a circumferential direction around the main body of the spoke mounting portion 32b. The spoke fixing protrusions 42 are preferably offset mirror images of the spoke fixing protrusions 41. In other words, the spoke fixing protrusions 42 are circumferentially offset from the spoke fixing protrusions 41 by an acute angle such as 15° and face in the opposite axial direction from the spoke fixing protrusions 41 as seen in FIG. 3.

Each of the spoke fixing protrusions 42 is configured and arranged to fix a pair of the spokes 21 thereto using one of the spoke fixing elements 33. Each of the spoke fixing protrusions 42 is preferably identical as shown. Of course, the spoke fixing protrusions 42 do not need to be identical if needed and/or desired.

Thus, the fixing portions or protrusions 41 and 42 of the hub shell 32 are individual radial projections that are circumferentially spaced apart about opposite ends of the hub shell 32. Since the fixing protrusions 41 and 42 are identically configured and dimensioned, except for orientation, only the fixing protrusions 41 on the spoke mounting portion 32a of hub shell 32 will be discussed and/or illustrated in detail.

Each of the spoke fixing protrusions 41 of the hub shell 32 has an axially facing surface with an insertion opening 41a that is dimensioned to receive one of the fixing elements 33, and a pair of circumferentially facing surfaces with a spoke opening or slot 41b. The spoke openings 41b extend from the circumferentially facing surfaces to the insertion opening 41a of the corresponding one of the spoke fixing protrusions 41. More specifically, the spoke openings 41b have center axes that extend outwardly at an obtuse angle (e.g., 159°) from the insertion opening 41a. In this embodiment, each of the spoke openings 41b extends in an axial direction along the circumferentially facing surfaces relative to the hub shell 32 such that the spoke openings 41b and the insertion opening 41a meet at the axially facing surface of the spoke fixing protrusion 41. In other words, in this embodiment, each of the spoke openings 41b is a slot that extends to a corresponding one of the axially facing surfaces of a corresponding one of the spoke fixing protrusions 41. This arrangement of the spoke openings 41b and the insertion opening 41a allows a pair of the spokes 21 and one of the fixing elements 33 to be inserted into the spoke openings 41b and the insertion opening 41a, respectively, in the assembled condition.

Figure 6:
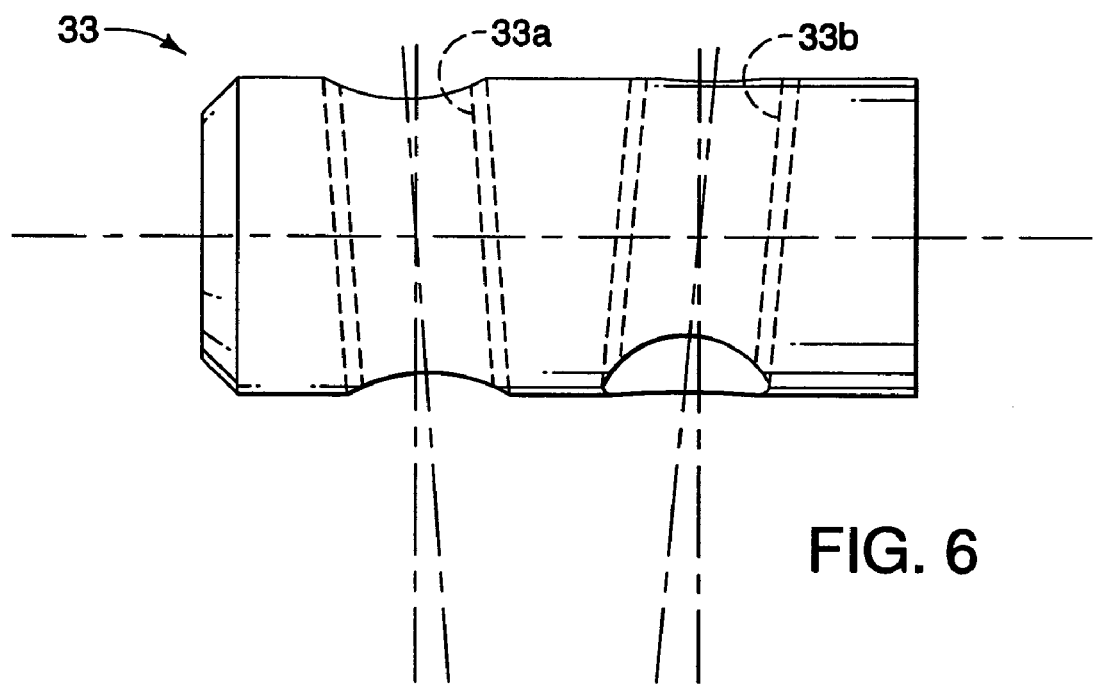
FIG. 6 is a side elevational view of one of the fixing elements for attaching a pair of spokes to the bicycle hub of the front wheel illustrated in FIGS. 1-5.
Figure 7:
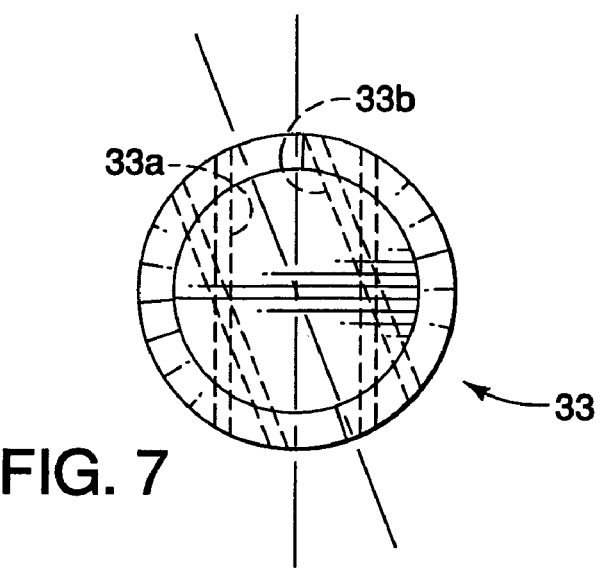
FIG. 7 is an axial end elevational view of the fixing element illustrated in FIG. 6 for attaching a pair of spokes to the bicycle hub of the front wheel illustrated in FIGS. 1-5.
Figure 8:
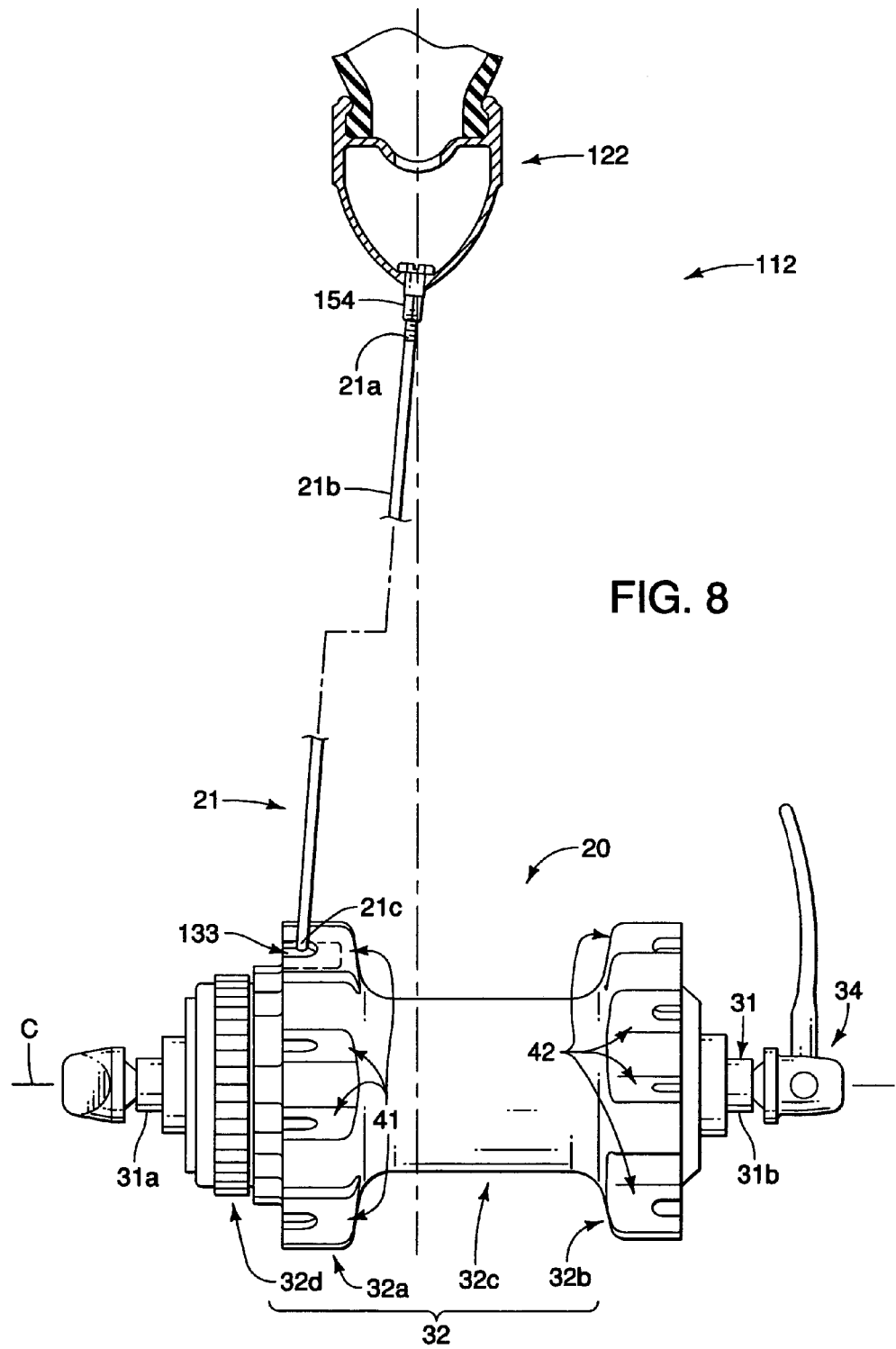
FIG. 8 is a partial rear side view of a front wheel in accordance with a second preferred embodiment of the present invention, with the bicycle hub shown in elevation and the rim shown in cross section.
Figure 9:
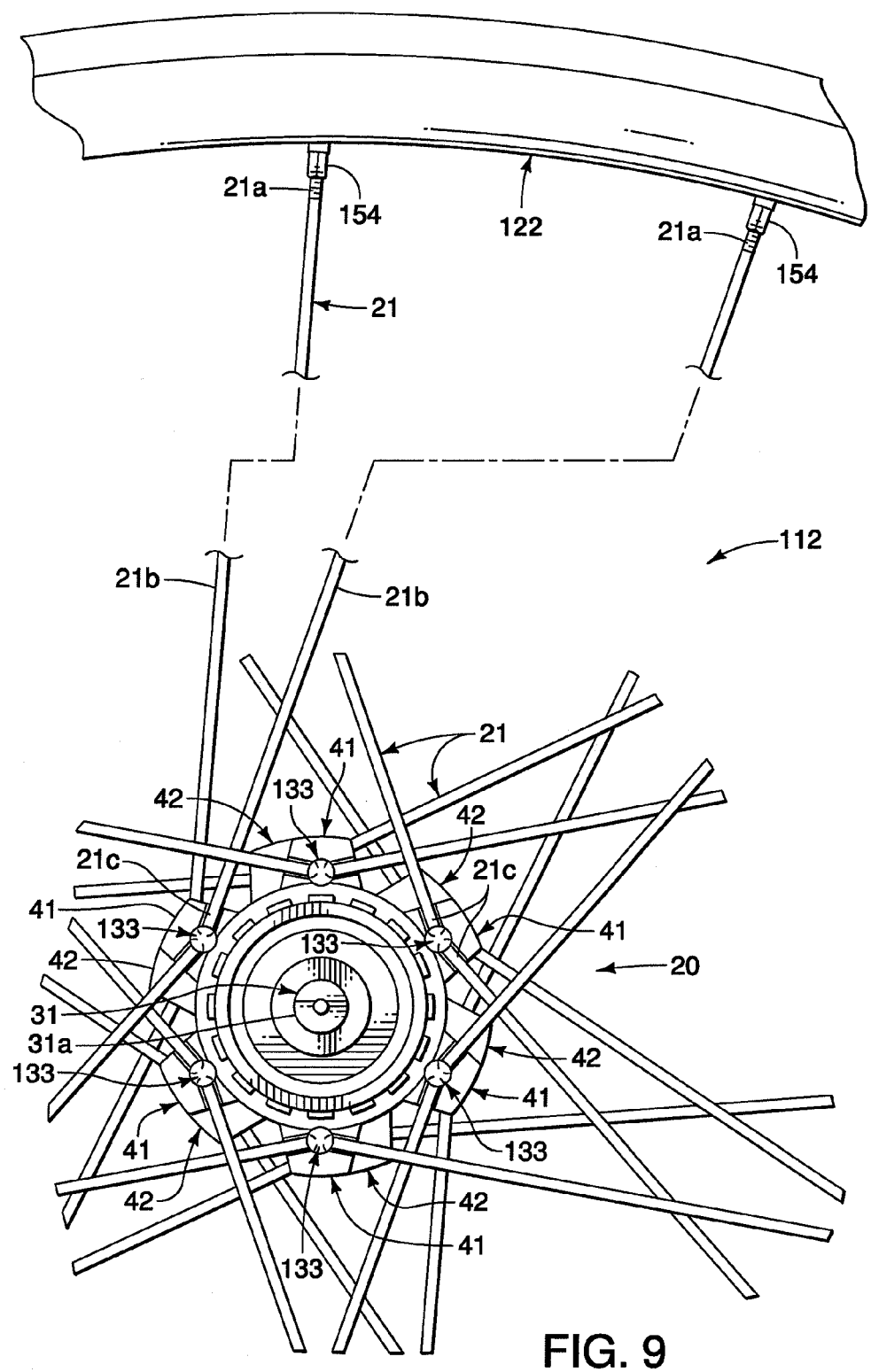
FIG. 9 is a partial side elevational view of the front wheel illustrated in FIG. 8 in accordance with the second embodiment of the present invention.
Figure 10:
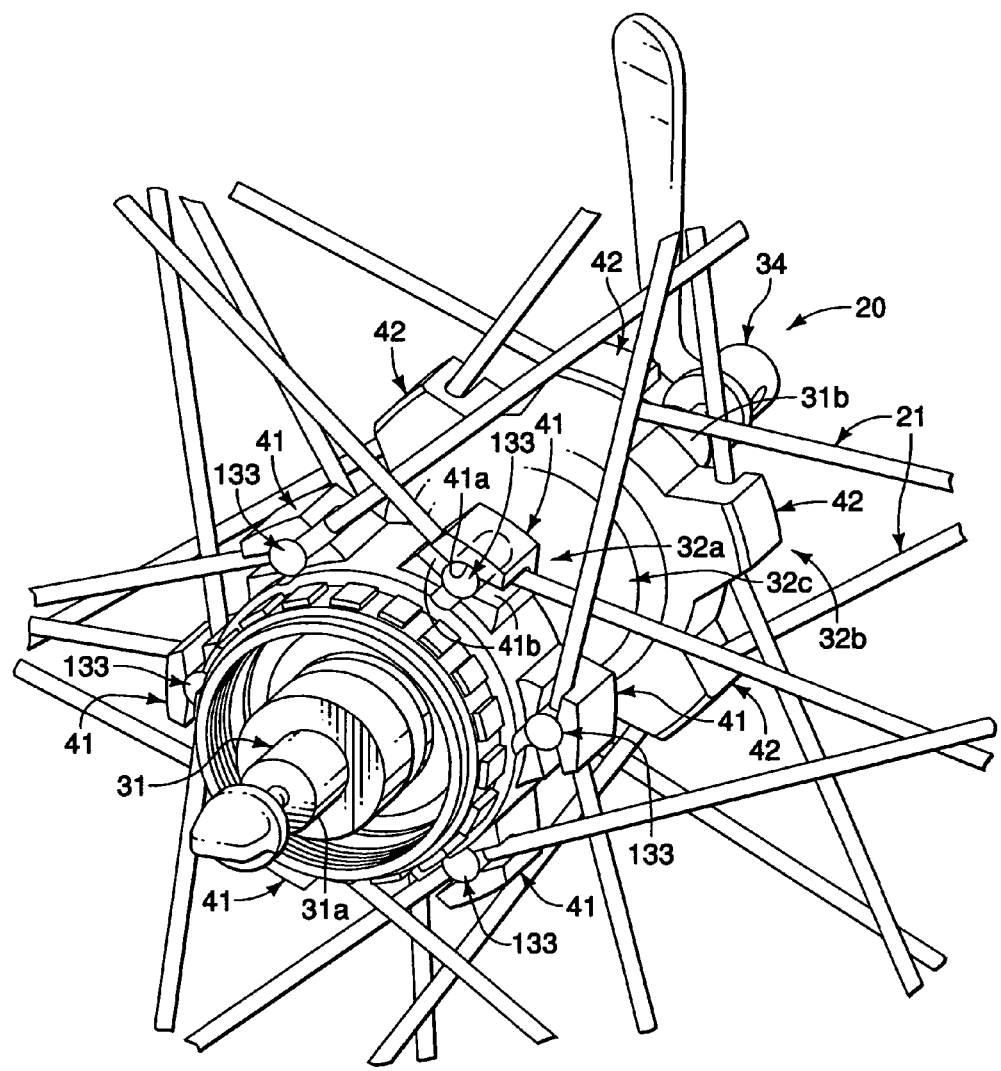
FIG. 10 is an enlarged partial perspective view of the bicycle hub and spokes of the front wheel illustrated in FIGS. 8 and 9 in accordance with the second embodiment of the present invention.
Figure 11:
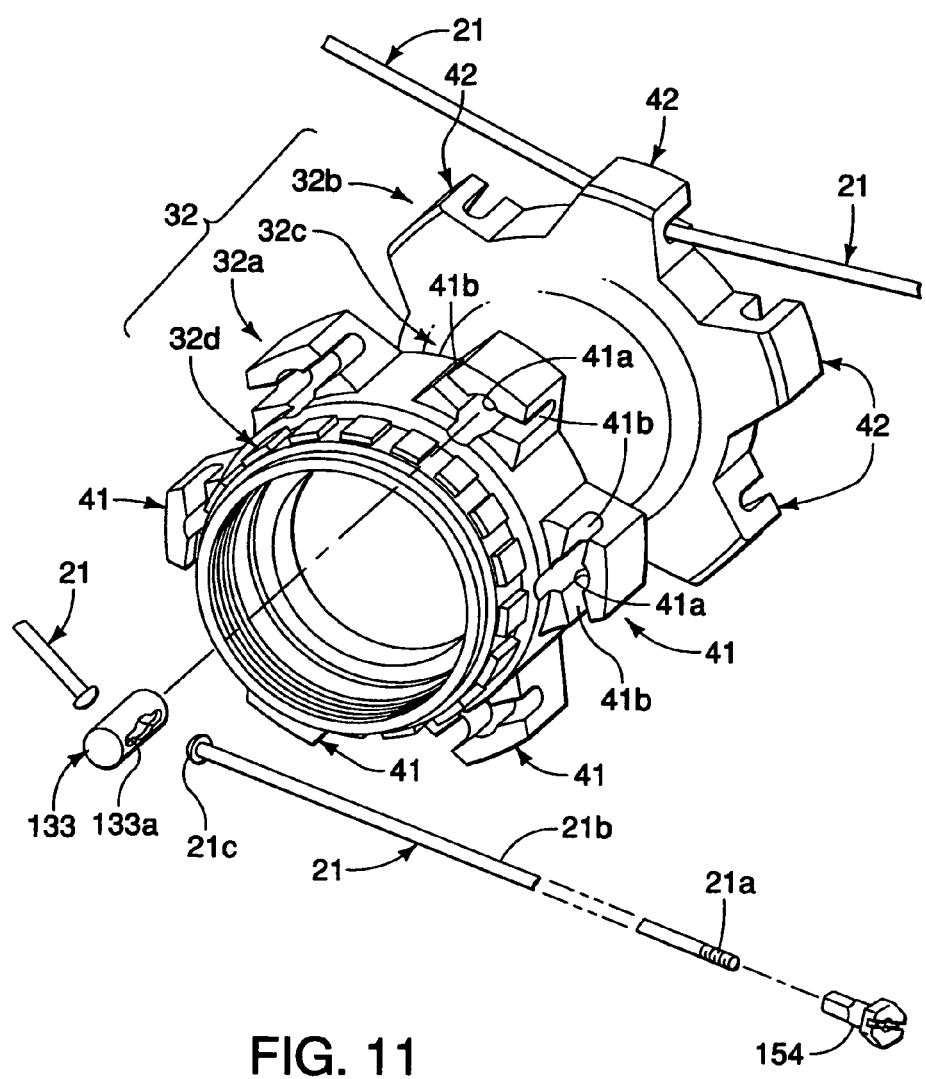
FIG. 11 is an exploded partial perspective view of the bicycle hub and some of the spokes of the front wheel illustrated in FIGS. 8-10 in accordance with the second preferred embodiment of the present invention.

As seen in FIG. 5, the fixing elements 33 are removably coupled to the fixing protrusions 41 and 42 of the hub shell 32. In particular, the fixing elements 33 are dimensioned to be inserted axially into the insertion openings 41a of the fixing protrusions 41 with a pair of the spokes 21 coupled thereto. As best seen in FIGS. 6 and 7, each of the fixing elements 33 has a pair of threaded bores 33a and 33b to attach a pair of the threaded inner end portion 21a of a pair of the spokes 21 to the hub shell 32. In this embodiment, each of the threaded bores 33a and 33b forms a spoke attachment structure of the fixing element 33 that is configured and arranged to threadedly receive one of the threaded inner end portion 21a of one of the spokes 21. The threaded bores 33a and 33b (spoke attachment structures) of each of the fixing elements 33 are arranged so that the spokes 21 from each of the fixing elements 33 extend outwardly at an obtuse angle (e.g., 159°). In other words, the center axes of the threaded bores 33a and 33b extend outwardly from each of the fixing elements 33 at an obtuse angle (e.g., 159°). In addition, the center axes of the threaded bores 33a and 33b are angled with respect to a plane that extends perpendicular to the center longitudinal axis of the fixing element 33. In particular, the threaded bores 33a forms an angle of about 4° with respect to a plane that extends perpendicular to the center longitudinal axis of the fixing element 33, while the threaded bores 33b forms an angle of about 5° with respect to a plane that extends perpendicular to the center longitudinal axis of the fixing element 33. The different angles of the center axes of the threaded bores 33a and 33b avoids interference between crossing pairs of the spokes 21.

Turning now to the description of the rim 22 as seen in FIGS. 1-3, the rim 22 is an annular member designed for rotation about the center axis C of the hub axle 31. The rim 22 is constructed of a substantially rigid material, such as those materials, which are well known in the art. For example, the rim 22 can be constructed of any suitable metallic material, such as plated steel, stainless steel, aluminum, magnesium or titanium, as well as other non-metallic materials, such as a carbon fiber composite. Preferably, the rim 22 is constructed of aluminum. The construction of the rim 22 will now be discussed in more detail below.

The rim 22 is substantially circular as seen in side elevation (FIG. 1). Basically, the rim 22 has a uniform cross-sectional profile as seen in FIG. 2, except for the absence of material for accommodating an air filling valve. The rim 22 basically includes an outer annular tire engaging portion 51 and an inner annular spoke attachment portion 52 that is integrally formed with the tire engaging portion 51. The rim 22 also includes a plurality of reinforcement members 53 fixedly coupled to the spoke attachment portion 52 at a plurality of attachment openings 52a. Basically, the tire engaging portion 51 and the spoke attachment portion 52 of the rim 22 have a uniform cross-sectional profile as seen in FIG. 2, except for the absence of material for accommodating an air filling valve and attachment openings 52a for accommodating the reinforcement members 53.

The tire engaging portion 51 is a U-shaped portion in cross section that includes a pair of annular side sections 51a and an annular outer bridge or connecting section 51b. The spoke attachment portion 52 is a U-shaped portion in cross section that extends downwardly from the tire engaging portion 51 to form a hollow interior therebetween. The annular side sections 51a form a pair of annular tire supporting surfaces and a pair of annular braking surfaces in a conventional manner. The tire supporting surfaces are opposed annular surfaces that face each other toward the center plane P. The tire supporting surfaces have annular ribs formed at their free ends to retain beads of the tire 23 in a conventional manner. The annular braking surfaces face outwardly away from the center plane P to engage conventional rim brakes.

The spoke attachment portion 52 preferably has twenty-four of the attachment openings 52a in order to attach a total of twenty-four spokes 21. Preferably, the attachment openings 52a are circumferentially equally spaced apart in the circumferential direction from each other as best understood from FIG. 1. Alternating ones of the attachment openings 52a are preferably slightly angled in opposite axial directions relative to the center plane P so that the spokes 21 coupled thereto extend to opposite ends of the hub 20. Preferably, the spokes 21 are coupled between the hub 20 and the rim 22 so that the wheel 12 is dished, i.e., the rim 22 is off set from the center of the hub 22 towards the end of the hub shell 32 that has the brake mounting portion 32d. Each of the attachment openings 52a is configured to receive a tubular part of one of the reinforcement members 53 therein.

The tire engaging portion 51 and the spoke attachment portion 52 are preferably integrally formed together as a one-piece unitary aluminum member to form a constant cross-sectional shape about the entire circumference of the rim 22. For example, the rim 22 can be constructed by extruding a length of aluminum with the cross-sectional shape illustrated in FIG. 2. Then, the extruded length of aluminum is bent into a circular shape, with the ends of the extruded length of aluminum being welded together. The attachment openings can be punched or drilled in a conventional manner before or after welding the free ends of the length of aluminum together. Finally, the reinforcement members 53 are bonded to the spoke attachment portion 52 of the rim 22 by welding, brazing, adhesive or the like.

The reinforcement members 53 are preferably formed as separate aluminum members from the spoke attachment portion 52 of the rim 22 by casting, machining and/or any other suitable manufacturing technique. The reinforcement members 53 are fixedly coupled to the spoke attachment portion 52 of the rim 22 in order to reinforce the rim 22.

The reinforcement members 53 will now be discussed in more detail. As mentioned above, the reinforcement members 53 are preferably identical members that are welded to the exterior surface of the spoke attachment portion 52 in order to permanently secure the reinforcement members 53 thereto. Each reinforcement member 53 is preferably constructed as a one-piece unitary member from a lightweight, rigid metallic material. Specifically, each reinforcement member 53 is preferably constructed of aluminum, as mentioned above. In any case, the reinforcement members 53 are preferably constructed of the same material as the spoke attachment portion 52, and are permanently bonded thereto to reinforce the rim 22. The reinforcement members 53 effectively increase the thickness of the spoke attachment portion 52 at the attachment openings 52a to provide rigid reinforcement to the rim 22.

In this embodiment, each of the reinforcement members 53 has a substantially inverted mushroom shape as best shown in FIG. 2. Specifically, each of the reinforcement members 53 has a threaded opening 53a in order to threadedly couple one of the spokes 21 thereto by an adapter 54. The adapters 54 are tubes with external threads 54a and a non circular (e.g., rectangularly shaped, hexagonally shaped, longitudinally splined, etc) tool engaging portion 54b. The adapters 54 are mounted on the shafts of the spokes 21 such that one end of the adapter 54 engages the head portion 21c of one of the spokes 21. The external threads 54a of the adapters 54 are configured to mate with the internal threads 53a of the reinforcement members 53. Thus, the spokes 21 can be adjustably, releasably and fixedly coupled to the rim 22 via the adapters 54.

Second Embodiment

Referring now to FIGS. 8-11, a portion of a modified front wheel 112 is illustrated in accordance with a second preferred embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. In other words, unless otherwise specified, the configuration of the front wheel of the second embodiment is the same as the configuration of the first embodiment.

The bicycle wheel 112 basically includes the center hub 20 of the first embodiment, a plurality of the spokes 21, and an annular rim 122 with the pneumatic tire 23. In this embodiment, the hub 20 uses modified spoke fixing elements 133 such that the head portions 21c of the spokes 21 engage the spoke fixing elements 133 and the threaded portions 21a of the spokes 21 are attached to the rim 122 via conventional spoke nipples 154 or the like. Thus, in this embodiment, the rim 122 is identical to rim 22, except for the elimination of the reinforcement members 53 and the modifications to accommodate the spoke nipples 154.

Similar to the first embodiment, the fixing elements 133 are removably coupled to the fixing protrusions 41 and 42 of the hub shell 32. In particular, the fixing elements 133 are dimensioned to be inserted axially into the insertion openings 41a of the fixing protrusions 41 with a pair of the spokes 21 coupled thereto. Each of the fixing elements 133 has a pair of identically shaped retaining slots 133a to attach a pair of the head portions 21c of a pair of the spokes 21 to the hub shell 32. In this embodiment, each of the retaining slots 133a forms a spoke attachment structure of the fixing element 133 that is configured and arranged to receive one of the head portions 21c of one of the spokes 21. Each of the retaining slots 133a (spoke attachment structures) has a center enlarged opening section and a pair of reduced width sections. The center enlarged opening section of the retaining slots 133a are dimensioned so that the head portions 21c of the spokes 21 can be easily inserted into the retaining slots 133a. The reduced width sections of the retaining slots 133a are dimensioned so that the head portions 21c of the spokes 21 are retained in the retaining slots 133a. Thus, after the head portions 21c of the spokes 21 are inserted into the center enlarged opening section of the retaining slots 133a, the head portions 21c of the spokes 21 are slid into one of the reduced width sections of the retaining slots 133a to retain the head portions 21c of the spokes 21 in the retaining slots 133a.

Similar to the first embodiment, the retaining slots 133a (spoke attachment structures) of each of the fixing elements 133 are arranged so that the spokes 21 from each of the fixing elements 133 extend outwardly at an obtuse angle (e.g., 159°). In other words, the center axes of the reduced width sections of the retaining slots 133a extend outwardly from each of the fixing elements 133 at an obtuse angle (e.g., 159°).

Third Embodiment

Figure 12:
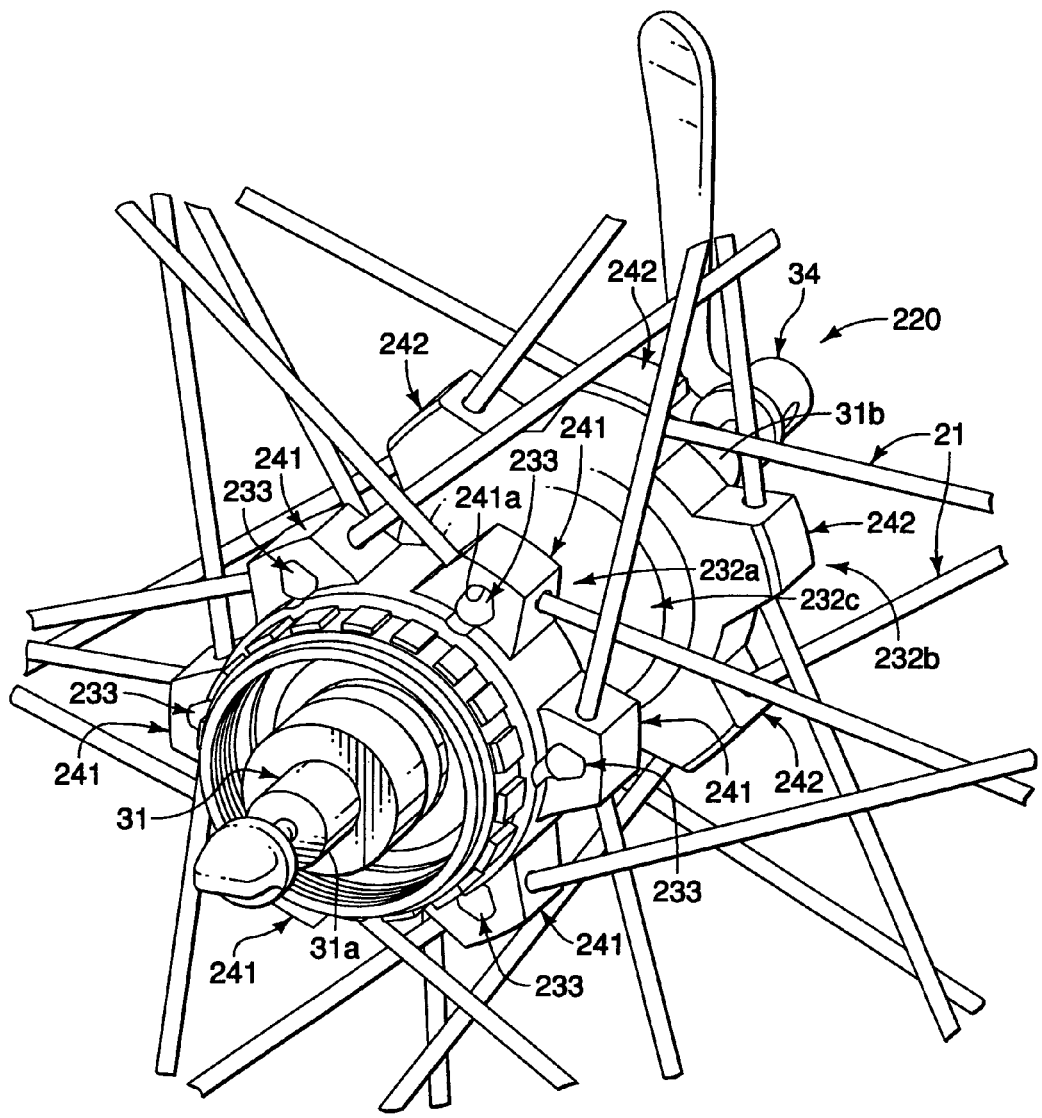
FIG. 12 is a partial side elevational view of a front wheel in accordance with a third embodiment of the present invention.
Figure 13:
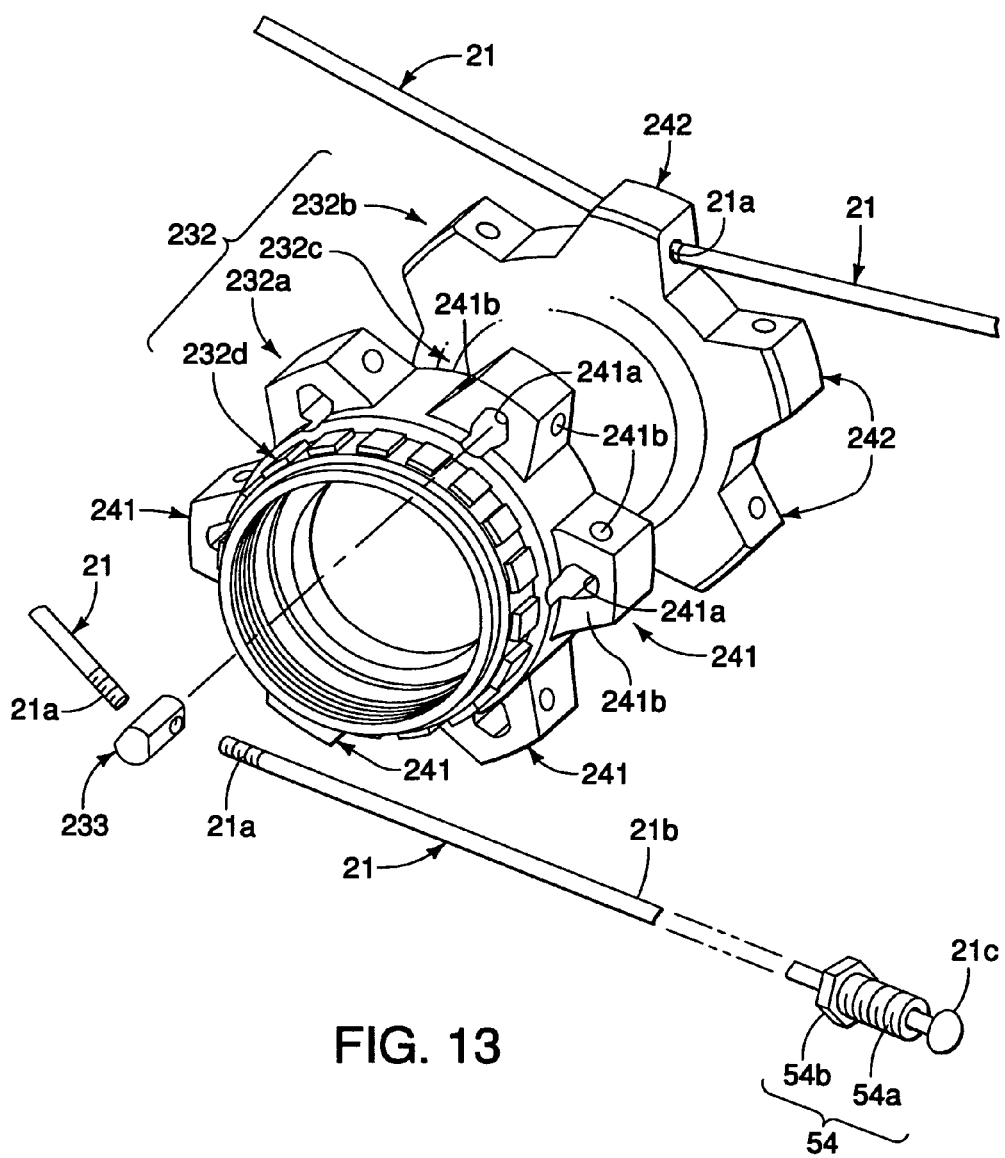
FIG. 13 is an enlarged partial perspective view of the bicycle hub and spokes of the front wheel illustrated in FIG. 12 in accordance with the third embodiment of the present invention.
Figure 14:
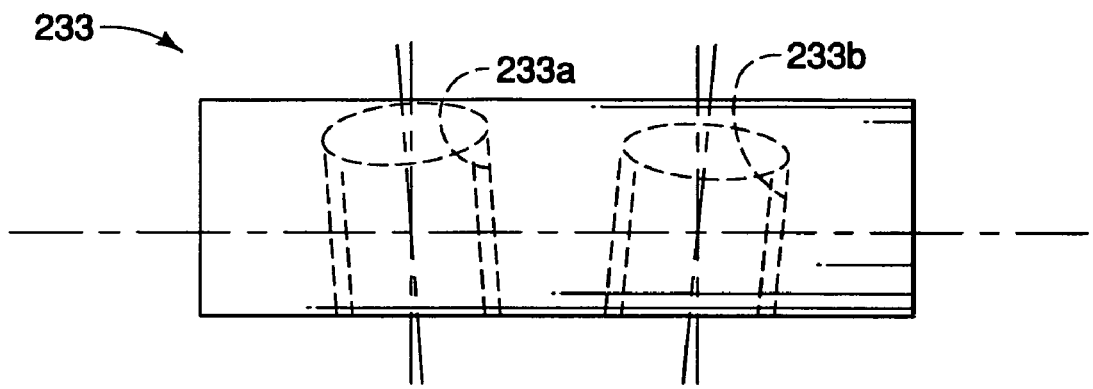
FIG. 14 is a side elevational view of one of the fixing elements for attaching two spokes to the bicycle hub illustrated in FIGS. 12 and 13.
Figure 15:
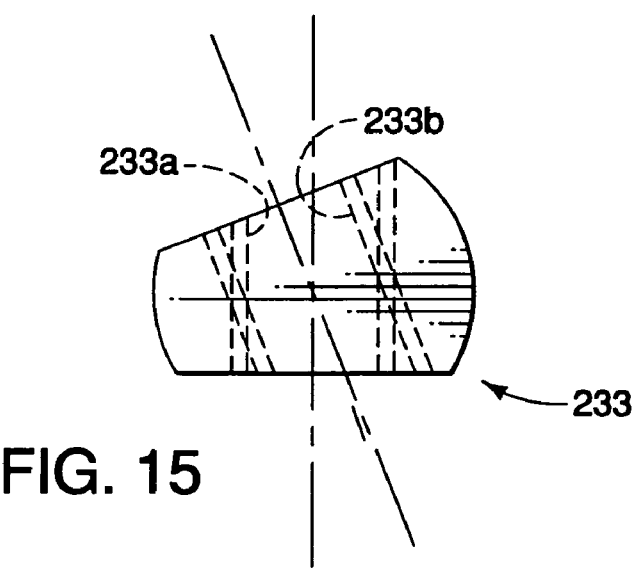
FIG. 15 is an axial end elevational view of the fixing element illustrated in FIG. 14 for attaching two spokes to the bicycle hub illustrated in FIGS. 12 and 13.

Referring now to FIGS. 12 and 13, a modified front hub 220 is illustrated in accordance with a third preferred embodiment. In view of the similarity between the third embodiment and the prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity. In other words, unless otherwise specified, the configuration of the front wheel of the third embodiment is the same as the configuration of the first embodiment.

In this embodiment, the hub 220 is identical to the hub 20 of the first embodiment, except that a modified hub shell 232 is used that has a plurality of modified spoke fixing elements 233. This embodiment uses the spokes 21 and the rim 22 of the first embodiment. In particular, the hub shell 232 is identical to the hub shell 32, except that the hub shell 232 includes a modified spoke mounting portions 232a and 232b. The remainder of the hub shell 232 is identical to the hub shell 32 as discussed above.

The spoke mounting portion 232a includes a plurality (six) of individual spoke fixing portions or protrusions 241 that extend outwardly in a radial manner from one end of the hub shell 232. The spoke fixing protrusions 241 are equally spaced apart in a circumferential direction around the main body of the spoke mounting portion 232a. Each of the spoke fixing protrusions 241 is configured and arranged to fix a pair of the spokes 21 thereto using one of the spoke fixing elements 233. Each of the spoke fixing protrusions 241 is preferably identical as shown. Of course, the spoke fixing protrusions 241 do not need to be identical if needed and/or desired.

Likewise, the mounting portion 232b includes a plurality (six) of individual spoke fixing portions or protrusions 242 that extend outwardly in a radial manner from one end of the hub shell 232. The spoke fixing protrusions 242 are equally spaced apart in a circumferential direction around the main body of the spoke mounting portion 232b. The spoke fixing protrusions 242 are preferably offset mirror images of the spoke fixing protrusions 241. In other words, the spoke fixing protrusions 242 are circumferentially offset from the spoke fixing protrusions 241 by an acute angle such as 15° and face in the opposite axial direction from the spoke fixing protrusions 241.

Each of the spoke fixing protrusions 242 is configured and arranged to fix a pair of the spokes 21 thereto using one of the spoke fixing elements 233. Each of the spoke fixing protrusions 242 is preferably identical as shown. Of course, the spoke fixing protrusions 242 do not need to be identical if needed and/or desired.

Thus, the fixing portions or protrusions 241 and 242 of the hub shell 232 are individual radial projections that are circumferentially spaced apart about opposite ends of the hub shell 32. Since the fixing protrusions 241 and 242 are identically configured and dimensioned, except for orientation, only the fixing protrusions 241 on the spoke mounting portion 232a of hub shell 232 will be discussed and/or illustrated in detail.

Each of the spoke fixing protrusions 241 of the hub shell 232 has an axially facing surface with an insertion opening 241a that is dimensioned to receive one of the fixing elements 233, and a pair of circumferentially facing surfaces with a spoke opening 241b. The spoke openings 241b are closed holes or bores that extend from the circumferentially facing surfaces to the insertion opening 241a of the corresponding one of the spoke fixing protrusions 241. More specifically, the spoke openings 241b have center axes that extend outwardly at an obtuse angle (e.g., 159°) from the insertion opening 241a.

The fixing elements 233 are removably coupled to the fixing protrusions 241 and 242 of the hub shell 232. Each of the fixing elements 233 has a non-circular transverse cross section that matches a non-circular transverse cross section of the insertion openings 241a of the fixing protrusions 241. Thus, the fixing elements 233 are dimensioned to be inserted axially into the insertion openings 241a of the fixing protrusions 241 with the fixing elements 233 being non-rotatably mounted in the insertion openings 241a of the fixing protrusions 241. Each of the fixing elements 233 has a pair of threaded bores 233a and 233b to attach a pair of the threaded inner end portion 21a of a pair of the spokes 21 to the hub shell 232. In this embodiment, each of the threaded bores 233a and 233b forms a spoke attachment structure of the fixing element 233 that is configured and arranged to threadedly receive one of the threaded inner end portion 21a of one of the spokes 21. The threaded bores 233a and 233b (spoke attachment structures) of each of the fixing elements 233 lie on a flat or planar surface of the fixing elements 233 so that the threaded bores 233a and 233b are aligned with the spoke openings 241b. In other words, the insertion openings 241a have a pair of flat or planar surfaces that are aligned with the spoke openings 241b so that the threaded bores 233a and 233b are aligned with the spoke openings 241b. The threaded bores 233a and 233b and the spoke openings 241b are arranged so that the spokes 21 from each of the fixing elements 233 extend outwardly at an obtuse angle (e.g., 159°). In other words, the center axes of the threaded bores 233a and 233b extend outwardly from each of the fixing elements 233 at an obtuse angle (e.g., 159°). In addition, the center axes of the threaded bores 233a and 233b are angled with respect to a plane that extends perpendicular to the center longitudinal axis of the fixing element 233. In particular, the threaded bores 233a forms an angle of about 4° with respect to a plane that extends perpendicular to the center longitudinal axis of the fixing element 233, while the threaded bores 233b forms an angle of about 5° with respect to a plane that extends perpendicular to the center longitudinal axis of the fixing element 233. The different angles of the center axes of the threaded bores 233a and 233b avoids interference between crossing pairs of the spokes 21.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Also as used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A bicycle hub assembly comprising:
an axle having a center axis;
a hub shell rotatably disposed about the axle with a plurality of axially extending insertion openings disposed at opposite ends of the hub shell; and
a plurality of fixing elements removably coupled to the hub shell by sliding the fixing elements axially into the insertion openings with each of the fixing elements having a pair of spoke attachment structures to attach a pair of inner ends of a pair of spokes to the hub shell, the hub shell having a plurality of axially extending spoke receiving slots aligned with the spoke attachment structures such that the fixing elements are axially insertable into the insertion openings after attaching a pair of spokes to each fixing element.

2. The bicycle hub assembly according to claim 1, wherein
the hub shell includes a plurality of fixing portions configured as individual radial projections that are circumferentially spaced apart about opposite ends of the hub shell.

3. The bicycle hub assembly according to claim 2, wherein
each of the individual radial projections of the hub shell has an axially facing surface with one of the insertion openings extending axially therefrom that receives one of the fixing elements, and a pair of circumferentially facing surfaces with each of the circumferentially facing surfaces having a spoke opening that extends to one of the insertion openings.

4. The bicycle hub assembly according to claim 3, wherein
each of the spoke openings is a slot that extends to a corresponding one of the axially facing surfaces of a corresponding one of the individual radial projections.

5. The bicycle hub assembly according to claim 3, wherein
each of the spoke openings is a closed bore.

6. The bicycle hub assembly according to claim 5, wherein
each of the fixing elements has a non-circular transverse cross section, and each of the insertion openings has a non-circular transverse cross section that mates with the non-circular transverse cross section of one of the fixing elements such that the fixing elements are non-rotatable within the insertion openings of the individual radial projections.

7. The bicycle hub assembly according to claim 1, wherein
each of the fixing elements includes a pair of threaded bores that form the pair of spoke attachment structures to receive threaded inner ends of the spokes.

8. The bicycle hub assembly according to claim 1, wherein
each of the fixing elements includes a pair of retaining slots that form the pair of spoke attachment structures to receive headed inner ends of the spokes.

9. The bicycle hub assembly according to claim 1, further comprising:
an annular rim; and
a plurality of spokes having outer ends attached to the rim and their inner ends attached to the fixing elements.

10. The bicycle hub assembly according to claim 9, wherein
the hub shell includes a plurality of fixing portions configured as individual radial projections that are circumferentially spaced apart about opposite ends of the hub shell.

11. The bicycle hub assembly according to claim 10, wherein
each of the individual radial projections of the hub shell has an axially facing surface with one of the insertion openings extending axially therefrom that receives one of the fixing elements, and a pair of circumferentially facing surfaces with each of the circumferentially facing surfaces having a spoke opening that extends to one of the insertion openings.

12. The bicycle hub assembly according to claim 11, wherein
each of the spoke openings is a slot that extends to a corresponding one of the axially facing surfaces of a corresponding one of the individual radial projections.

13. The bicycle hub assembly according to claim 11, wherein
each of the spoke openings is a closed bore.

14. The bicycle hub assembly according to claim 13, wherein
each of the fixing elements has a non-circular transverse cross section, and each of the insertion openings has a non-circular transverse cross section that mates with the non-circular transverse cross section of one of the fixing elements such that the fixing elements are non-rotatable within the insertion openings of the individual radial projections.

15. The bicycle hub assembly according to claim 9, wherein
each of the fixing elements includes a pair of threaded bores that form the pair of spoke attachment structures and receive threaded inner ends of the spokes.

16. The bicycle hub assembly according to claim 9, wherein
each of the fixing elements includes a pair of retaining slots that form the pair of spoke attachment structures and receive headed inner ends of the spokes.

17. A bicycle hub assembly comprising:
an axle having a center axis;
a hub shell rotatably disposed about the axle with a plurality of axially extending insertion openings disposed at opposite ends of the hub shell; and
a plurality of fixing elements removably coupled to the hub shell by sliding the fixing elements axially into the insertion openings with each of the fixing elements having a pair of spoke attachment structures to attach a pair of inner ends of a pair of spokes to the hub shell, each of the fixing elements having a non-circular transverse cross section as viewed along a fixing element axis parallel to the center axis, and each of the insertion openings having a non-circular transverse cross section that mates with the non-circular transverse cross section of one of the fixing elements, the non-circular transverse cross sections of the insertion openings and the fixing elements being configured relative to each other such that the spoke attachment structures of the fixing elements are maintained in alignment with spoke openings of the hub shell that extend to the insertion openings prior to attachment of spokes to the fixing elements.

18. The bicycle hub assembly according to claim 17, wherein
the hub shell has a plurality of closed spoke receiving bores aligned with the spoke attachment structures when the fixing elements are mounted in the insertion openings.

19. The bicycle hub assembly according to claim 17, further comprising:
an annular rim; and
a plurality of spokes having outer ends attached to the rim and their inner ends attached to the fixing elements.

20. A bicycle hub assembly comprising:
an axle having a center axis;
a hub shell rotatably disposed about the axle with a plurality of axially extending insertion openings disposed at opposite ends of the hub shell; and
a plurality of fixing elements removably coupled to the hub shell by sliding the fixing elements axially into the insertion openings with each of the fixing elements having a pair of spoke attachment structures to attach a pair of inner ends of a pair of spokes to the hub shell, each of the fixing elements including a pair of retaining slots that form the pair of spoke attachment structures to receive headed inner ends of the spokes, each of the retaining slots having an enlarged opening section sized to receive a head portion of the headed inner end of a spoke therethrough and a reduced width section laterally offset from the enlarged opening section that is sized to retain the head portion after inserting the head portion through the enlarged opening section.

21. The bicycle hub assembly according to claim 20, further comprising:

an annular rim; and a plurality of spokes having outer ends attached to the rim and their inner ends attached to the fixing elements.

22. A bicycle hub assembly comprising:

an axle having a center axis;

a hub shell rotatably disposed about the axle with a plurality of axially extending insertion openings disposed at opposite ends of the hub shell, the hub shell including a plurality of fixing portions configured as individual radial projections that are circumferentially spaced apart about opposite ends of the hub shell, each of the individual radial projections of the huh shell having an axially facing surface with one of the insertion openings extending axially therefrom, and a pair of circumferentially facing surfaces with each of the circumferentially facing surfaces having a spoke opening that extends to an insertion opening with each spoke opening being a closed bore; and a plurality of fixing elements removably coupled to the hub shell by sliding the fixing elements axially into the insertion openings with each of the fixing elements having a pair of spoke attachment structures to attach a pair of inner ends of a pair of spokes to the hub shell, the spoke attachment structures of each of the fixing elements being arranged so that the pair of spokes extending from each of the fixing elements extend outwardly at an obtuse angle relative to each other, each of the fixing elements having a non-circular transverse cross section, and each of the insertion openings having a non-circular transverse cross section that mates with the non-circular transverse cross section of one of the fixing elements such that the fixing elements are non-rotatable within the insertion openings of the individual radial projections, each of the fixing elements including a pair of flat surfaces that mate with a pair of flat surfaces of one of the insertion openings.

23. The bicycle hub assembly according to claim 22, further comprising:

an annular rim; and a plurality of spokes having outer ends attached to the rim and their inner ends attached to the fixing elements.

* * * * *